US006830310B2

(12) United States Patent
Iu et al.

(10) Patent No.: US 6,830,310 B2
(45) Date of Patent: Dec. 14, 2004

(54) DETECTABLE MARKERS IN CATIONIC POLYMERIC FIXERS

(75) Inventors: Kai Kong Iu, San Diego, CA (US); Yi-Hua Tsa, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/279,261

(22) Filed: Oct. 23, 2002

(65) Prior Publication Data

US 2004/0080557 A1 Apr. 29, 2004

(51) Int. Cl.[7] .............................. B41J 29/393; B41J 2/01
(52) U.S. Cl. ............................. 347/19; 347/102; 347/95
(58) Field of Search .......................... 347/100, 19, 101, 347/102, 95, 96; 106/31.6, 31.13

(56) References Cited

U.S. PATENT DOCUMENTS

| | | | |
|---|---|---|---|
| 5,681,380 A | | 10/1997 | Nohr et al. |
| 6,145,979 A | * | 11/2000 | Caiger et al. ............... 347/102 |
| 6,149,719 A | * | 11/2000 | Houle ..................... 106/31.58 |
| 6,443,568 B1 | | 9/2002 | Askeland et al. |
| 6,576,155 B1 | * | 6/2003 | Barbera-Guillem ...... 106/31.64 |
| 6,664,017 B1 | * | 12/2003 | Patel et al. ................. 430/120 |
| 2002/0122922 A1 | | 9/2002 | Yamada et al. |

FOREIGN PATENT DOCUMENTS

| | | | |
|---|---|---|---|
| EP | 1138509 A2 | 10/2001 | |
| WO | WO 99/54144 | 10/1999 | |
| WO | WO 02/45970 | 6/2002 | |
| WO | WO 02/45971 | 6/2002 | |
| WO | WO 0245971 A1 * | 6/2002 | ............ B41M/5/00 |
| WO | WO 03/066709 | 8/2003 | |
| WO | WO 03/082589 | 10/2003 | |

OTHER PUBLICATIONS

Journal of Molecular Structure; "Substituent Effects On Absorption And Flourescence Spectra Of Carbostyrils"; by: Walter MF Fabian, et al.; 1999; pp.: 209–220.

* cited by examiner

Primary Examiner—Manish Shah (57) ABSTRACT

A cationic polymeric fixer material including cationic polymers and at least one marker composition soluble in the fixer material and detectable under either ultraviolet or near IR light; as well as a method of inkjet printing using said fixer material and a method of detecting cationic polymeric fixer material on a printed media using said fixer material.

7 Claims, 9 Drawing Sheets

DETECTABLE MARKERS IN CATIONIC POLYMERIC FIXERS

FIELD OF THE INVENTION

The present invention relates to fixer materials which can be used in cationic polymeric fixers in inkjet printing and which contain a marker which makes the fixer detectable when the fixer is printed on a media surface.

BACKGROUND OF THE INVENTION

Dye-based ink-jet inks have become a dominant technology in the ink-jet ink arena. However, as many dyes are water-soluble, images printed using many of such dye-based ink jet inks are not as waterfast as may be desirable. The waterfastness and durability of an anionic dye-based ink-jet ink printed on media has been shown to be enhanced by overprinting or underprinting the printed image with a fixer, preferably from a separate pen. Fixers have been used to crash out anionic dye molecules by changing the pH of the printed inkjet image or by adding salts such as $Ca^{2+}$ and $Mg^{2+}$ to the printed inkjet image to crash the colorants, e.g. anionic pigments or carboxylated dyes. These fixers had the disadvantages of lacking durability, of causing pen wear and tear and corrosion due to the high salt content and the low pH.

More recently, cationic polymers have been used in the fixer. Thus, when the cationic polymer and the anionic dye contact one another on a substrate, a reaction between the dye and the polymer creates an image with improved durability and waterfastness. Inkjet images with improved waterfastness and durability can therefore be obtained by underprinting or overprinting a printed inkjet image with a cationic polymeric fixer.

Fixer solutions are often transparent and thus invisible when printed on a medium substrate. This has necessitated the inclusion of markers or indicators so that nozzle health, pen alignment and dot placement of the fixer can be evaluated. With only weakly cationic fixers, traditional UV and near-IR indicators like Stilbene and Tinolux BBS have been used. These are anionic, sulfonated markers visualized with UV and near IR light. Such anionic indicators react with cationic polymers and thus cannot be used in a cationic polymeric fixer.

SUMMARY OF THE INVENTION

The present invention relates to a method of detecting a cationic polymeric fixer material present on an inkjet printed media, comprising
 a) inkjet printing the cationic polymeric fixer material onto a media substrate;
 b) exposing the printed media substrate with ultraviolet or near IR light;
wherein said fixer material comprises cationic polymers and at least one marker composition soluble in the fixer material and detectable under either ultraviolet or near IR light.

Furthermore, the present invention relates to a cationic polymeric fixer material comprising cationic polymers and at least one marker composition soluble in the fixer material and detectable under either ultraviolet or near IR light.

Additionally, the present invention relates to a method of inkjet printing on a media substrate, comprising:
 a) inkjet printing an ink comprising an anionic colorant onto the media substrate;
 b) either underprinting before step a) or overprinting after step a) a cationic polymeric fixer material onto the media substrate;
wherein said cationic polymeric fixer material comprises cationic polymers and at least one marker composition soluble in the fixer material and detectable under either ultraviolet or near IR light.

DETAILED DESCRIPTION

Inkjet inks with anionic colorants have been found to work well with fixer solutions comprising cationic polymers. The use of such cationic polymer fixer solutions increase durability and waterfastness of anionic colorant ink-printed images.

The fixer solution can be applied on the media substrate before, after, or both before and after the ink is printed. In a preferred embodiment, the fixer solution is applied before the ink is printed.

The fixer solution can be applied onto the media substrate by any means available to spread the fixer accurately onto the substrate surface to be printed. In a preferred embodiment, the fixer solution is filled in a thermal inkjet pen and the fixer is applied on the media before and/or after the color inks are applied. As a non-limiting example, an HP Business Inkjet 2200 can be used.

Cationic polymer fixer solutions are usually colorless and therefore invisible. As a result, a marker or indicator is desirable to be included in the fixer solution so that the nozzle health, pen alignment and dot placement of the fixer can be evaluated.

Overall, the criteria used in searching for fixer markers are as follows:
 1) Cationic and non-ionic materials are preferred. Certain zwitterionic materials may be useful. The main concern is achieving long-term compatibility with fixer polymer.
 2) Little absorption in the visible light region is desirable, so that the fixer printed area won't be seen under normal light conditions.

3) High solubility in water and the fixer vehicle is important to achieve pen reliability.

4) Sharp absorbance in the UV or IR region is desirable. Fluorescence in the visible region is also preferred, although it is not required.

5) High extinction coefficient is helpful so that little material is needed in the fixer for visualization.

Both visible dye and UV/near-IR dyes have been considered as markers for these fixer solutions. The visible dye provides the convenience of providing a way to examine the nozzle health visibly. The need to find an indicator that does not interfere with the hue of the inks is obvious. In contrast, the UV or near-IR dye interfere less with the hue of the colored inks under which it is underprinted.

Figure 1:
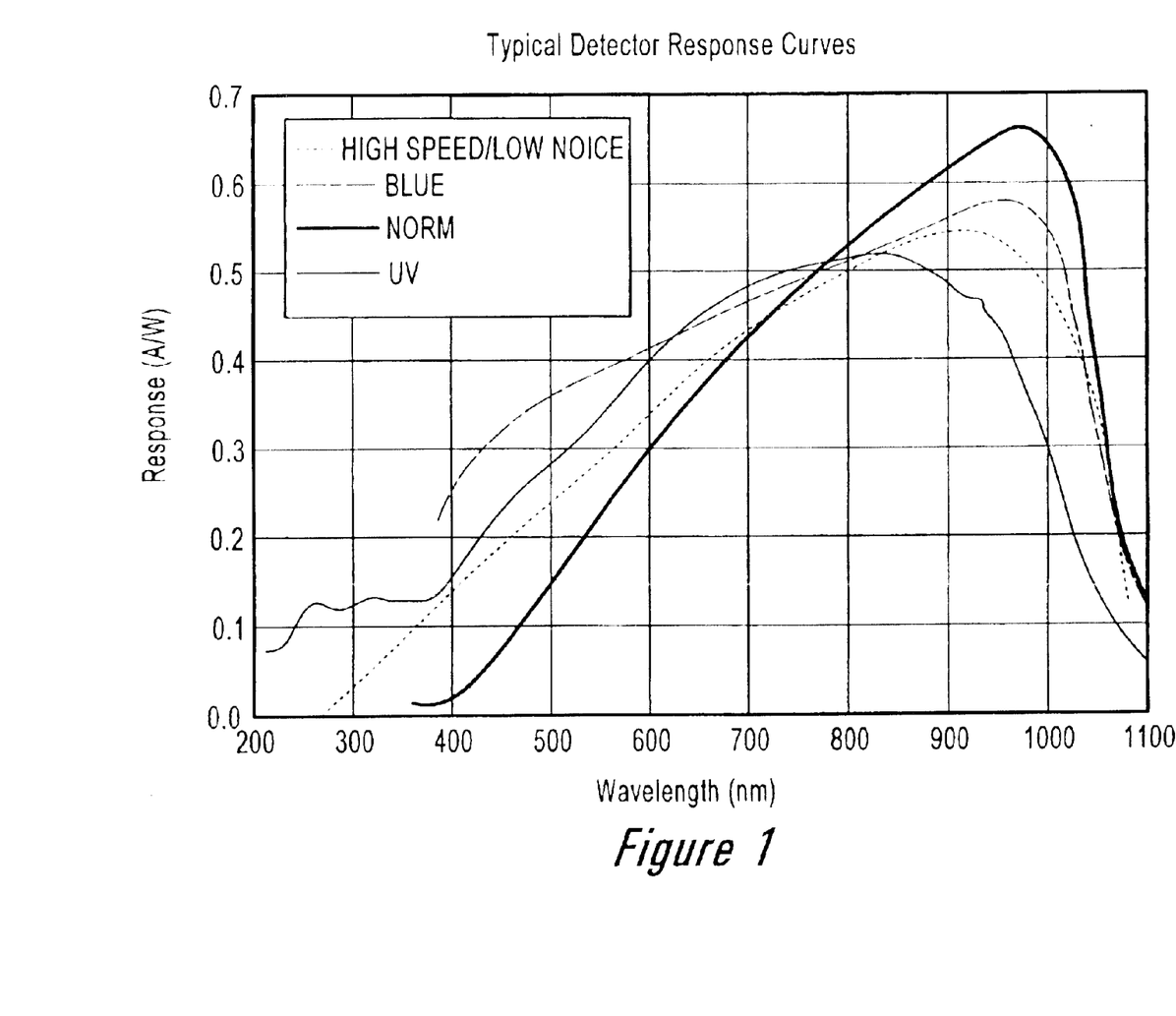
FIG. 1 graphs wavelength (nanometers)(nm) vs. response (amplitude/wave) (A/W) to show the typical spectral sensitivity of silicon detectors.

There are advantages and disadvantages in both UV and near IR as well. With UV, the indicator itself is clear and no color is introduced into the fixer solution. However the sensitivity of the UV detection (as shown in FIG. 1) is so low that high loading of the UV indicator is necessary. This in turn can cause reliability problems, such as decap. In contrast, the sensitivity of the near-IR region is high, therefore less loading of the indicator is required. Furthermore, when solid state optical detectors are used, it has been found that near-IR dye indicators are more detectable than UV dye indicators.

Since most currently used UV and near-IR indicators, such as Stilbene and Tinolux BBS, are sulfonated, they are therefore anionic. The present applicants have encountered definite instability and incompatibility of the fixers when they have used such anionic indicators with cationic polymers. The overall effect is that the anionic indicators crash out over time with the cationic polymers and cause reliability issues.

The present applicants have instead found that if the UV and/or near-IR indicators are either cationic, zwitterionic or not ionically charged, they do not have the instability and incompatibility problems of conventional anionic indicators when used in a cationic polymeric fixer. A non-limiting list of examples of such indicators that are not anionic and show some detectable change under either ultraviolet or near IR light include 1,1',3,3,3',3'-Hexamethylindodicarbocyanine iodide (dicarbocyanine); 1,1',3,3,3',3'-Hexamethylindotricarbocyanine iodide (tricarbocyanine); Basic Violet 16; 4,4'-Diaminostilbene dihydrochloride (aminostilbene); Victoria Blue BO; 4-amino-benzoic acid (PABA); 7-amino-4-methyl coumarin (AMC); 7-diethylamino-4-methyl coumarin (DAMC); 3-[2-(diethylamino)ethyl]-7-hydroxy-4-methylcoumarin hydrochloride; and Carbostyril 124.

To be most effective to increase durability and waterfastness of the printed image on the medium, the cationic polymers used in the fixer need to be highly reactive to fix the anionic colorants in the printed image. In a preferred embodiment, polyguanidines and polyethyleneimines have been found to be effective cationic polymers for this purpose.

In a more preferred embodiment, the cationic polymers are polymonoguanidines, preferably poly (C$_{3-18}$-hydrocarbyl monoguanidines).

In a most preferred embodiment, the poly(C$_{3-18}$-hydrocarbyl monoguanidines) comprise groups selected from the group consisting of Formula (1) and Formula (2) or salts thereof:

Formula (1)

Formula (2)

wherein:
each m is independently 0 or 1;
each Y is independently a C$_{2-18}$-hydrocarbyl group;
A and B are hydrocarbyl groups which together comprise a total of 3 to 18 carbon atoms; and
each R is independently hydrogen, alkyl, alkoxy, substituted alkyl or substituted alkoxy.

In another most preferred embodiment, the poly(C$_{3-18}$-hydrocarbyl monoguanidines) comprise at least one group of Formula (3) or salts thereof:

Formula (3)

wherein:
n is from 2 to 50.

EXAMPLES

Example 1

Figure 2:
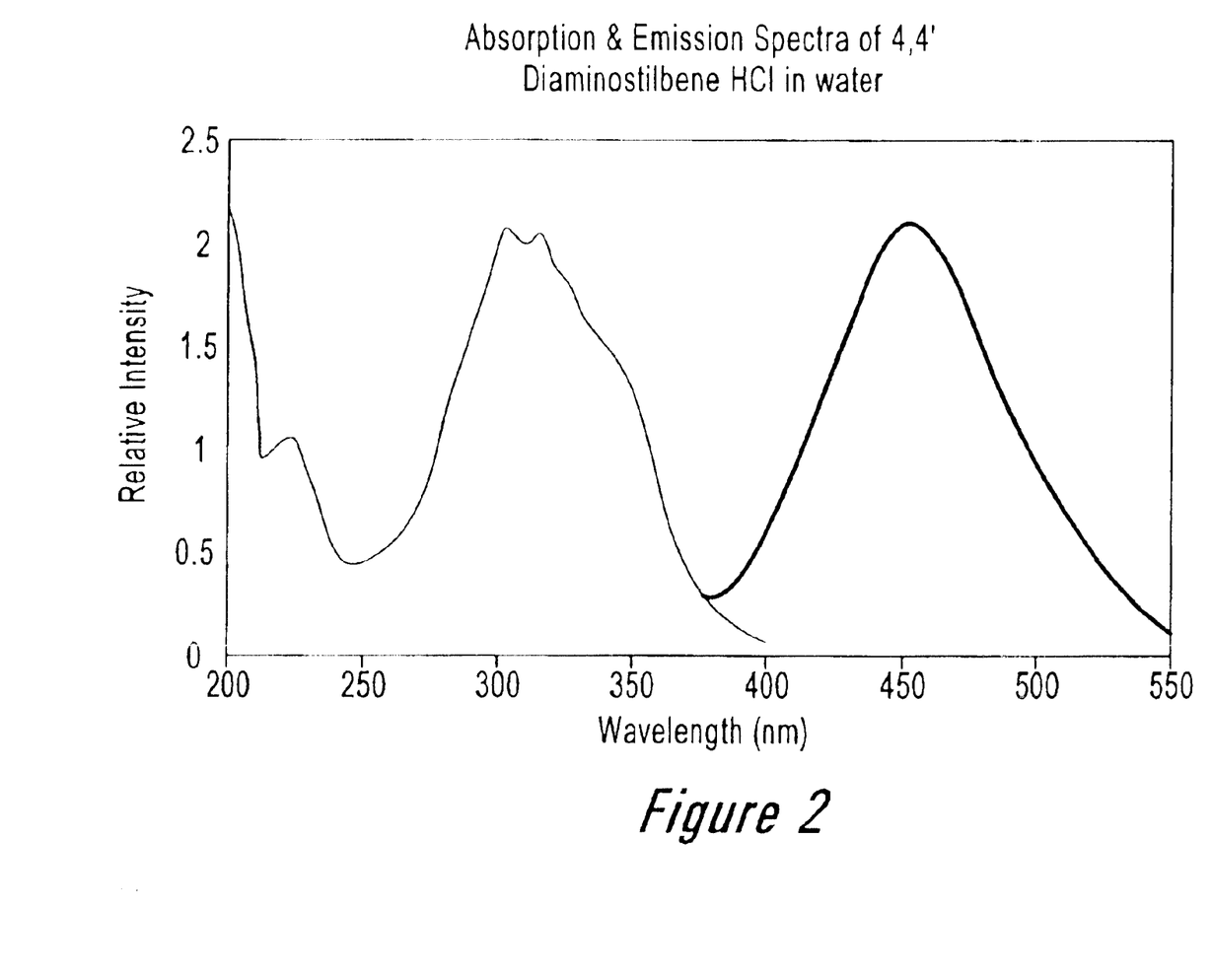
FIG. 2 graphs wavelength (nm) vs. relative intensity to show the absorption and emission spectra of 4,4'-Diaminostilbene dihydrochloride.

Stilbene is one of the high fluorescence yielding UV dyes that has been widely used as a dye. Stilbene itself is not soluble in the fixer vehicle that is mostly water. To increase its solubility in water, charged groups such as —SO$_3^{2-}$ or —NH$_3^+$ must be attached to the stilbene. One of these stilbene derivatives, 4,4'-Diaminostilbene dihydrochloride is shown below:

The absorption and emission (excited@ 344 nm) spectra of 4,4'-Diaminostilbene dihydrochloride is shown in FIG. 2. 750 ppm of 4,4'-Diaminostilbene dihydrochloride was spiked into a fixer containing a polymonoguanadine-based cationic polymer and the nozzle pattern was observed under UV exposure.

Example 2

Figure 3:
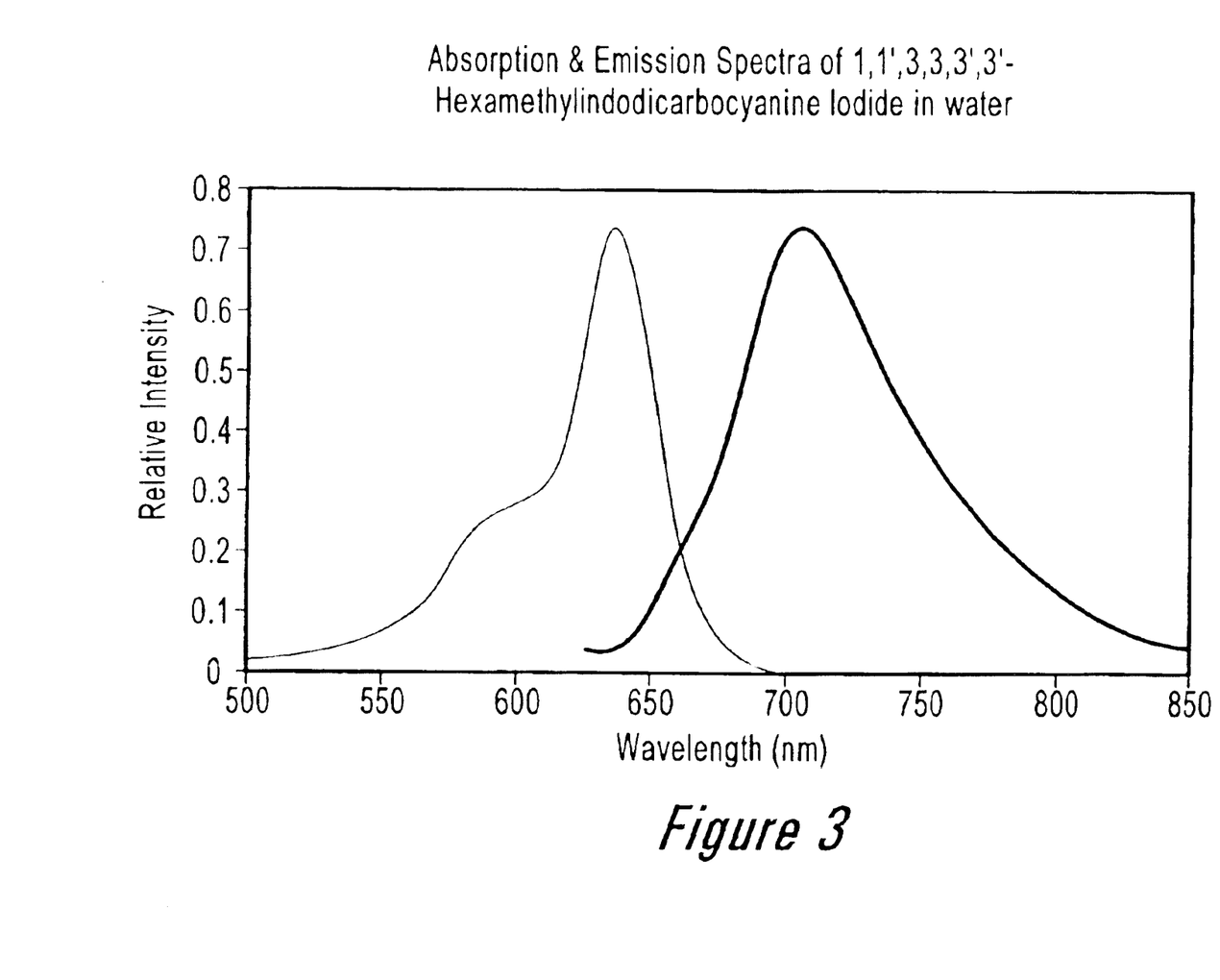
FIG. 3 graphs wavelength (nm) vs. relative intensity to show the absorption and emission spectra of 1,1',3,3,3',3'-Hexamethylindodicarbocyanine Iodide in water.

As a fixer indicator in the near-IR range of wavelengths, two carbocyanine dyes were tested. The carbocyanines were: 1,1',3,3,3',3'-Hexamethylindodicarbocyanine iodide and 1,1',3,3,3',3'-Hexamethylindotricarbocyanine iodide. They are shown below:

1,1′,3,3,3′,3′-Hexamethylindodicarbocyanine iodide 1,1′,3,3,3′,3′-Hexamethylindotricarbocyanine iodide The absorption and emission (excited@ 585 nm) of dicarbocyanine is shown in FIG. 3.

Figure 4:
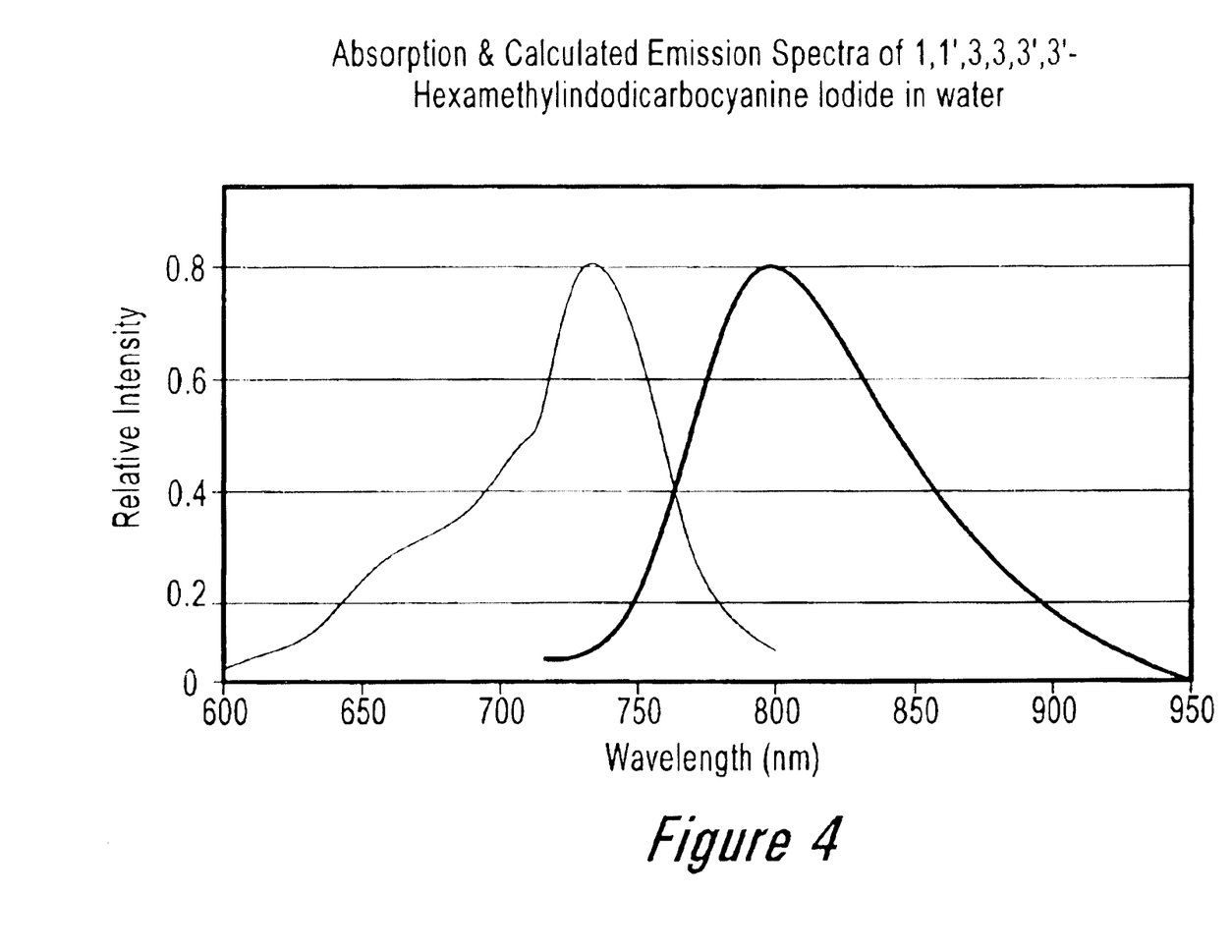
FIG. 4 graphs wavelength (nm) vs. relative intensity to show the absorption and calculated emission spectra of 1,1',3,3,3',3'-Hexamethylindotricarbocyanine Iodide in water.

In the case of tricarbocyanine, there is one more ethylene group on the chain. The higher conjugation shifts both the absorption and emission further to the red region as shown in FIG. 4. Since the measuring limit is only up to 850 nm, the emission curve on the FIG. 4 is a calculated curve based on the dicarbocyanine data where the distance of $\lambda_{max}$ for absorption and emission is 60 nm. From the absorption and emission standpoint, the tricarbocyanine would be a better choice due to a clearer fixer solution and higher detection sensitivity. Unfortunately, introduction of the ethylene group to the chain decreases the tricarbocyanine solubility in water. 750 ppm of tricarbocyanine was not soluble in the polymonoguanadine thermal inkjet fixer.

Based on this experiment, dicarbocyanine was good enough to use as a marker in the cationic polymer fixer. Tricarbocyanine would work better if there was higher detection sensitivity since the dye has only limited solubility.

Example 3

Figure 5:
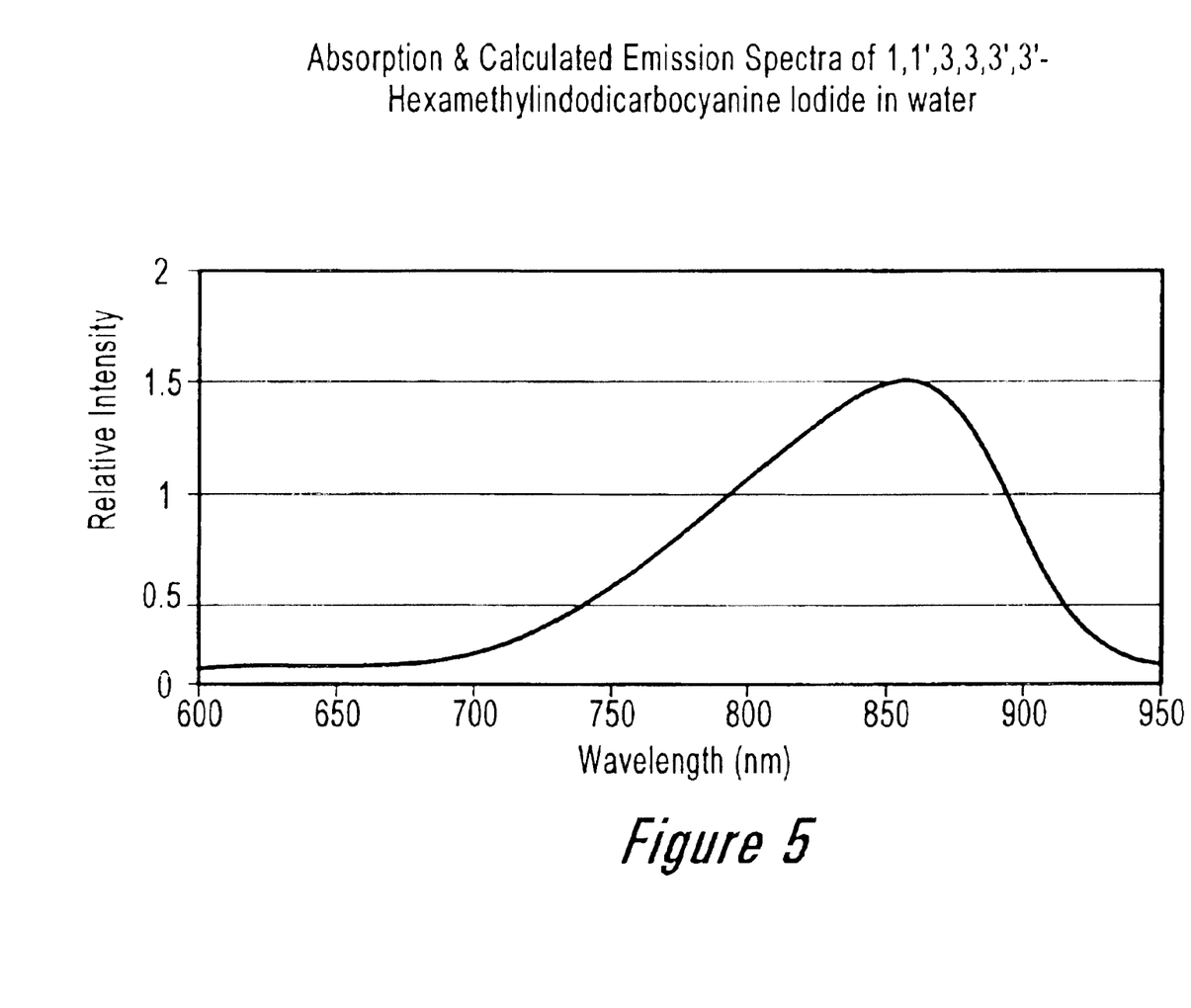
FIG. 5 graphs wavelength (nm) vs. relative intensity to show the absorption spectra of Basic Violet 16 (BV16).

As indicated above, visible indicators would be easiest to use since any thermal inkjet grade cationic dyes, such as Basic Violet 16, can be used. Although thermal inkjet grade quality Basic Violet 16 was not available, the grade used worked fine in the test. In order to see the nozzle pattern, it was found that the loading must be a least 750 ppm. FIG. 5 shows the absorption spectra of Basic Violet 16 in water.

Example 4

Fixer solutions were made by mixing a water based fixer containing a polymonoguanadine cationic polymer with an IR or UV absorber indicator. The list of indicators and some of their characteristics are summarized in the Table below. It was found that some of the indicators did not satisfy all of the criteria that would be desirable as indicated above. Most of the indicators that were not soluble in polymonoguanidine fixer or show strong color were eliminated from printing experiments (as indicated under "Print Evaluation"). Three media were printed with various fixers+indicators on a modified HP2200 printer: Hammermil Fore DP (HM), Lustro Laser (LL) and Fortune Matte (FM). In general, Fixer+indicator was difficult to detect on HM and FM and possible to detect on LL but not easy to achieve under UV illuminant.

Figure 6:
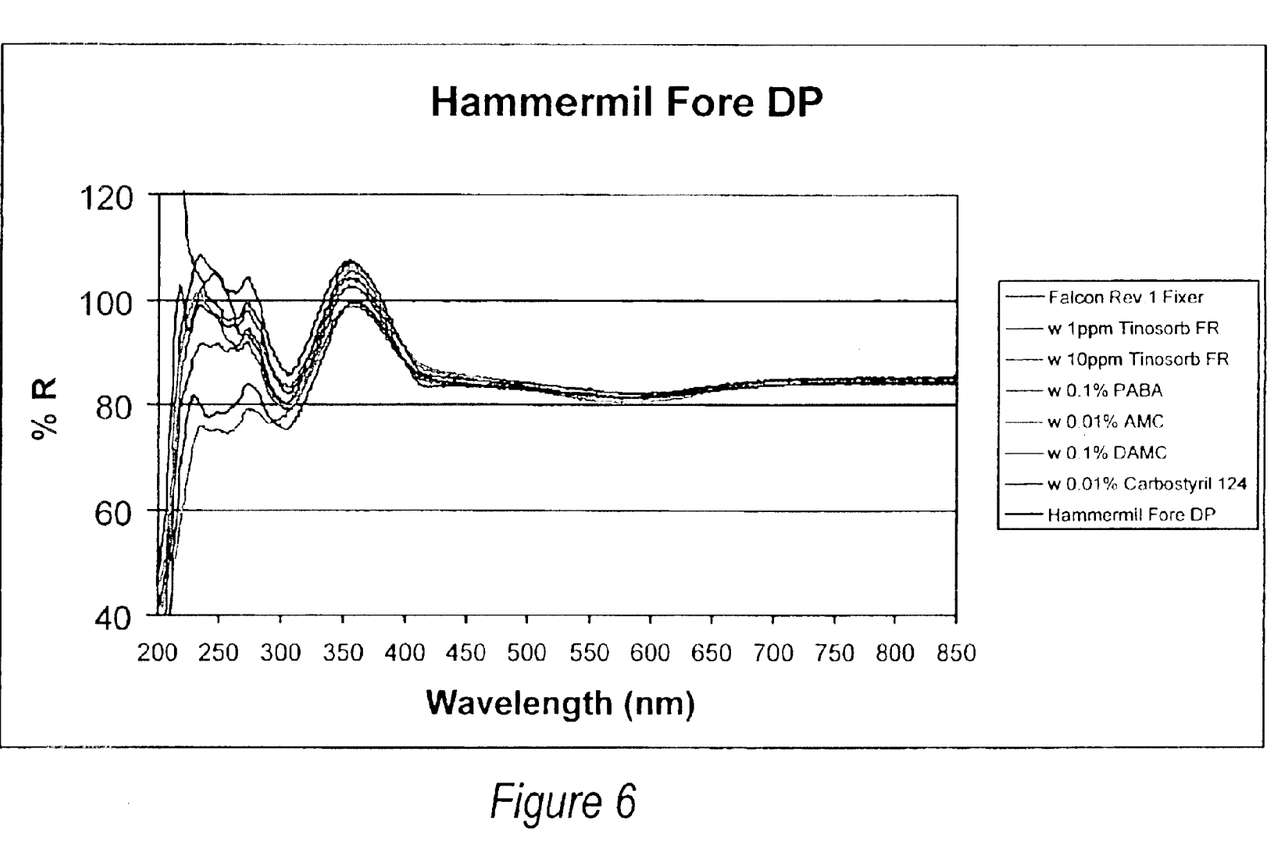
FIG. 6 graphs wavelength (nm) vs. percent reflectance (% R) to show the reflectance spectra of various fixer+indicators on Hammermil Fore DP (HM).
Figure 7:
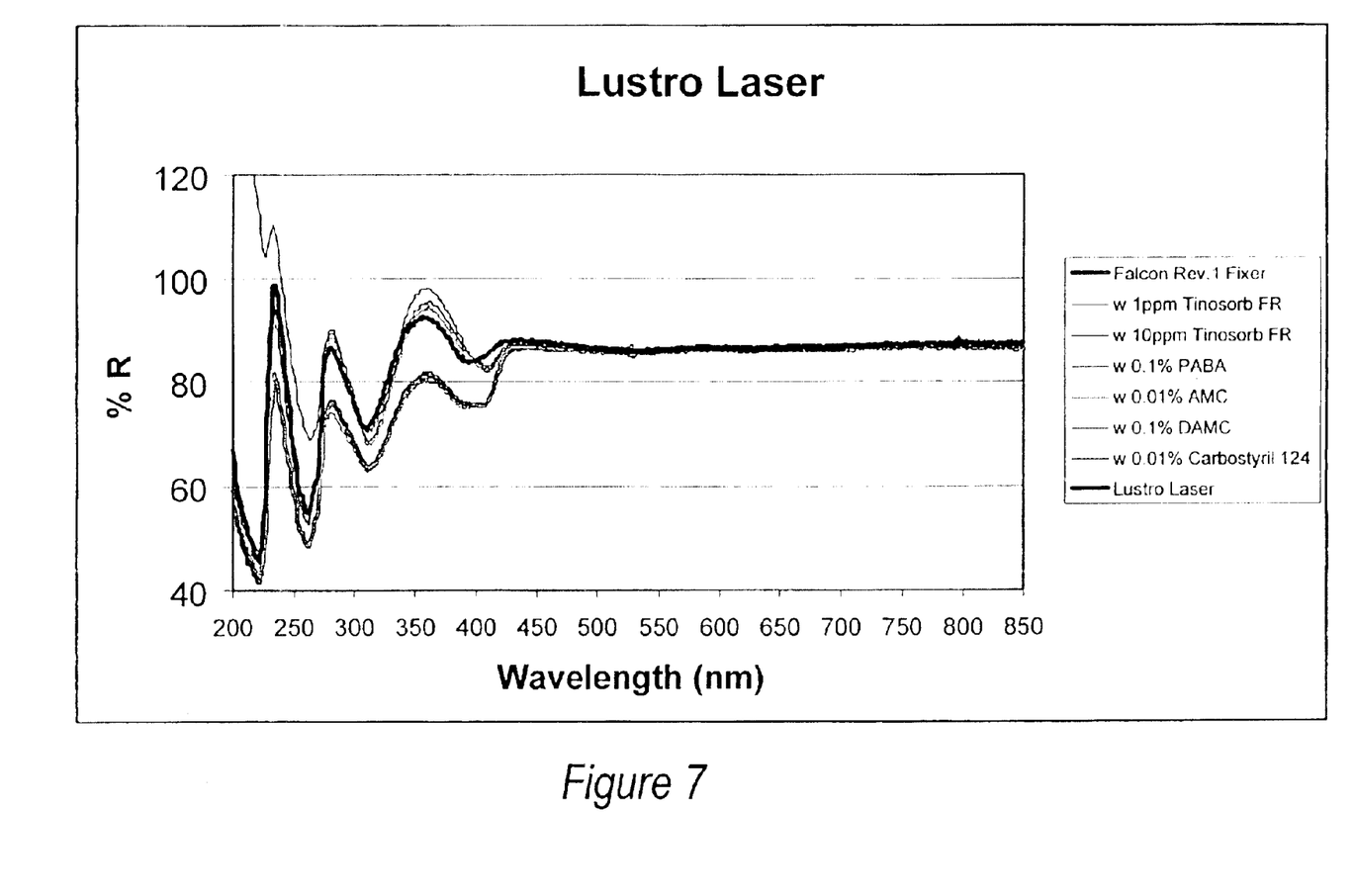
FIG. 7 graphs wavelength (nm) vs. percent reflectance (% R) to show the reflectance spectra of various fixer+indicators on Lustro Laser (LL).
Figure 8:
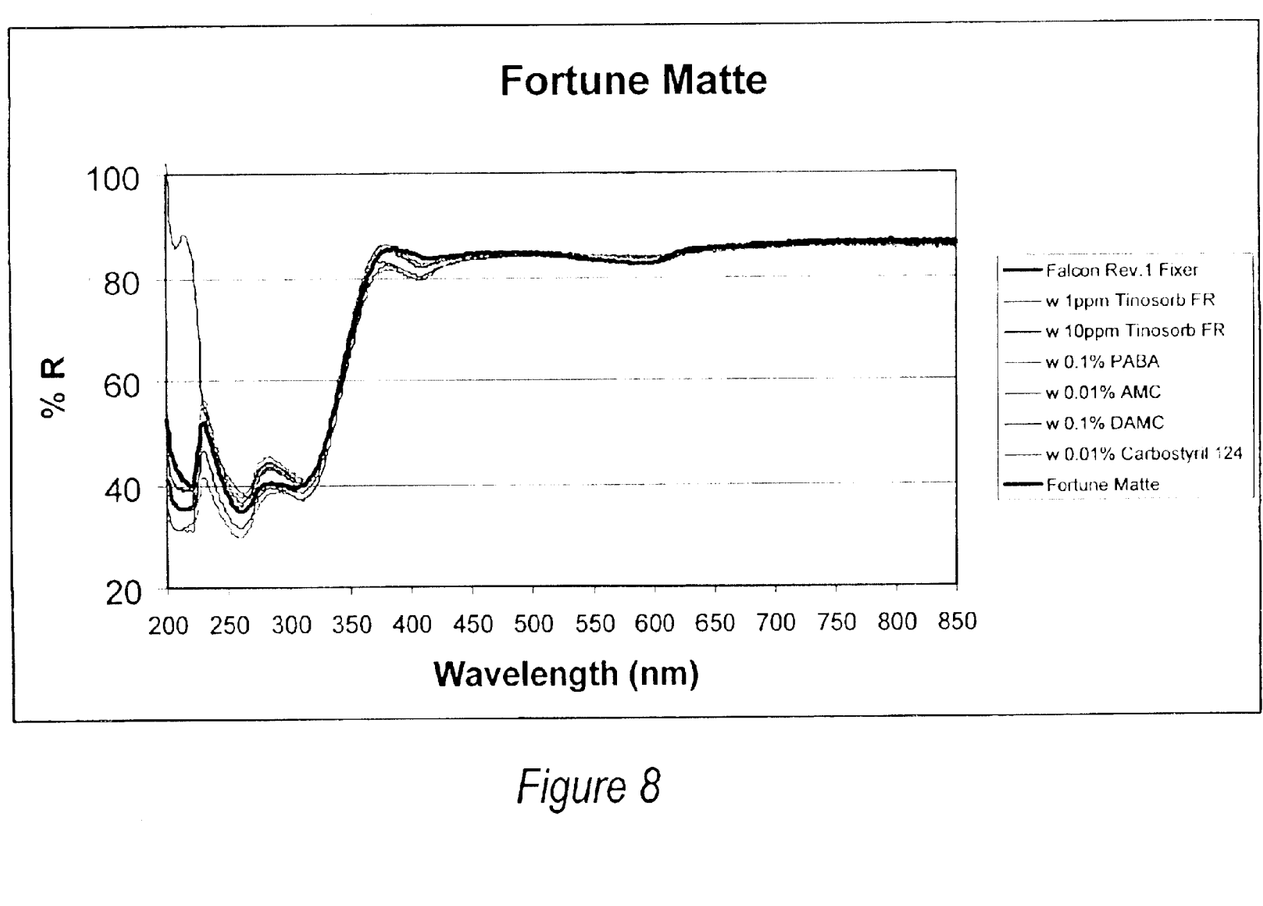
FIG. 8 graphs wavelength (nm) vs. percent reflectance (% R) to show the reflectance spectra of various fixer+indicators on Fortune Matte (FM).

The % R of fixer+indicator printed area as well as the media itself was measured with a Cary Spectrometer using diffuse mode. The spectra on HM, LL and FM printed with various fixers are shown in FIGS. 6–8 respectively.

Figure 9:
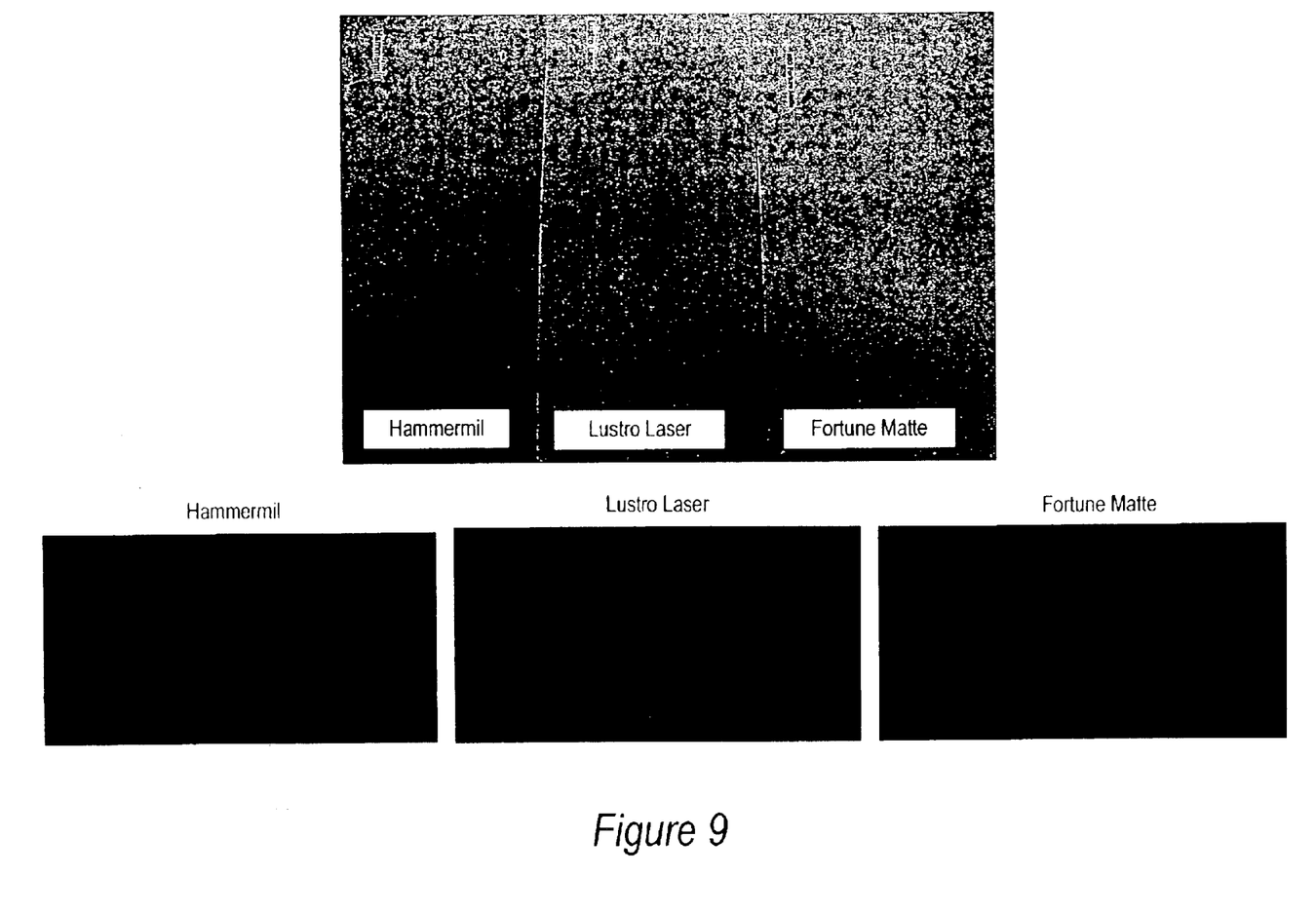
FIG. 9 shows comparative photographs of HM, LL, FM media printed with fixer+indicator (+0.1% DAMC) under normal office light and under UV (366 nm) light.

Hammermill Fore DP:

All indicator-containing fixers showed similar results to the fixer itself without indicator when the print is illuminated under UV (366 nm) except for 0.1% DAMC. The contrast between the fixer+indicator printed area and the media was visible but very poor. The reflectance measurements showed that with 0.1% PABA and 1 ppm Tinosorb FR there was a slight decrease in reflectance at 260 nm or so. With 0.1% DAMC, the fixer+indicator printed area was brighter than the media and was most visible under UV among all the indicators tested (shown in FIG. 9).

Lustro Laser:

The contrast between the fixer+indicator printed area and the media was visible with the fixer+indicator printed area appearing darker under UV illumination. Not much difference was seen among different additives under UV except for AMC, DAMC and Carbostyril 124. With AMC, DAMC and Carbostyril 124, fixer printed area is brighter than the media.

7-Diethylamino-4-methyl coumarin

7-Amino-4-methyl coumarin

Carbostyril 124

Fortune Matte:

The fixer+indicator printed area is brighter than the media under UV, contrary to what is observed on HM and LL. The contrast is actually quite good when viewed under UV. At ~260 nm the reflectance measurements for media and fixer+indicator printed area are almost identical except that PABA (4-aminobenzoic acid} shows slightly high reflectance than the media alone. Again, the 0.1% DAMC works well under UV.

PABA

Overall, there is a slight difference seen in the UV region with PABA @260 nm, which may not be sufficient enough for detection. Fixer with 0.1% DAMC works the best of all the materials screened on HM, LL and FM under UV illumination. It also shows a small peak of reflectance around 210–230 nm on all three media tested.

"−" indicates negatively charged materials, "n" indicates nonionic materials and "z" indicates zwitterionic materials which carry a net zero charge.

2) The solubility is based on the solubility of the compound in a 4 wt % polymonoguanadine fixer.
3) "Color" refers to the color of the fixer solution in the presence of the compound.
4) The X'ed blocks indicate insufficient solubility and/or strong color present. These chemicals are not suitable for fixer indicator.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

TABLE

| Compound | Charge | λmax (nm) | Fluorescent under UV? | Solubility @ 0.1% | Solubility @ 0.01 % | Color | Print Evaluation (view under UV @ 366 nm) |
|---|---|---|---|---|---|---|---|
| 2-[4-(Dimethylamino) styryl]pyridine | + | 369 | No | No | Not tested | Orange | XXXXXXXXXXXX |
| 4-Aminobenzoic acid (PABA) | z | ? | No | Yes | Yes | Clear | Similar to Control. Some changes in %R @ ~260 nm on HM, LL and FM. |
| 4-Methylesculetin | n | 348 | No | No | No | Clear | XXXXXXXXXXX |
| 7-Amino-4-methyl coumarin | + | 354 | Yes | No | Yes | Clear | No fixer can be seen on HM. Fixer is visible on LL and FM. |
| 7-Diethylamino-4-methyl coumarin | + | ? | Yes | Yes | Yes | Slightly yellow | Fixer visible under UV on HM, LL and FM. |
| 3-[2-(Diethylamino) ethyl]-7-hydroxy-4-methylcoumarin hydrochloride | + | ? | Yes | Not tested | Yes | Slightly yellow | Fixer slightly visible on HM. Fixer visible on LL and FM. |
| Carbostyril 124 | + | 350 | Yes | No | Yes | Clear | Fixer slightly visible on HM. Fixer visible on LL and FM. |
| Cationic copper phthalocyanine | + | 768 | No | No | No | Blue-Green | XXXXXXXXXXXX |
| Coumarin 152 | n | 395 | Yes | No | No | Slightly Yellow | XXXXXXXXXXXX |
| Coumarin 7 | + | 438 | Yes | No | No | Yellow | XXXXXXXXXXXX |
| Direct Yellow 9 | − | 402 | No | No | Not Tested | Yellow | XXXXXXXXXXXX |
| FluorescentBrightner28 | z | 350 | Yes | No | No | Clear | XXXXXXXXXXXX |
| Indocyanine Green | − | 775 | No | No | No | Green | XXXXXXXXXXXX |
| IR140 | + | 823 | No | No | No | Pale Blue | XXXXXXXXXXXX |
| Lumichrome | + | 392 | Yes | No | No | Clear | XXXXXXXXXXXX |
| Pinacryptol Yellow | + | 385 | No | No | Not tested | Yellow | XXXXXXXXXXXX |
| Thioflavin T | + | 412 | No | No | Yes | Yellow | XXXXXXXXXXXX |
| Tinosorb FR Dispersion | z | ? | Yes | No | No (clear at 0.001%) | Clear | Similar to control |
| Variamine Blue | + | 377 | No | Yes | Yes | Yellow | XXXXXXXXXXXX |
| Victoria Blue BO | + | 619 | No (Fluorescent under IR) | Not tested | Yes | Blue | Visible under IR |
| Control (Fixer only) | | | | | | | Fixer barely visible on HM, slightly visible on LL, visible on FM. |

Note:
1) The "charge" indicated is a rough estimate of the charge of the compound in the fixer solution based on the chemical structure of the compound. No detailed study of pKa was done. "+" indicates positively charged materials,

What is claimed is:
1. A method of detecting a cationic polymeric fixer material present on an inkjet printed media, comprising
   a) inkjet printing the cationic polymeric fixer material onto a media substrate;

b) exposing the printed media substrate with ultraviolet or near IR light;

wherein said fixer material comprises cationic polymers and at least one marker composition soluble in the fixer material and detectable under either ultraviolet or near IR light;

and wherein said cationic polymers and said at least one marker composition are not reactive with each other in the cationic polymeric fixer material.

2. The method of claim 1 wherein the at least one marker composition is selected from the group consisting of 1,1',3,3,3',3'-Hexamethylindodicarbocyanine iodide (dicarbocyanine); 1,1',3,3,3',3'-Hexamethylindotricarbocyanine iodide (tricarbocyanine); Basic Violet 16; 4-amino-benzoic acid (PABA); 4,4'-Diaminostilbene dihydrochloride (diaminostilbene); Victoria Blue BO; 7-amino-4-methyl coumarin (AMC); 7-diethylamino-4-methyl coumarin (DAMC); 3-[2-(diethylamino)ethyl]-7-hydroxy-4-methylcoumarin hydrochloride; and Carbostyril 124.

3. The method of claim 1 wherein the cationic polymers are selected from the group consisting of polyguanadines and polyethyleneimines.

4. The method of claim 3 wherein the cationic polymers are polymonoguanadines.

5. The method of claim 4 wherein the polymonoguanadines are poly($C_{3-18}$-hydrocarbyl monoguanidines).

6. The method of claim 5 wherein the poly($C_{3-18}$-hydrocarbyl monoguanidine) comprises groups selected from the group consisting of Formula (1) and Formula (2) or salts thereof:

Formula (1)

Formula (2)

wherein:

each m is independently 0 or 1;

each Y is independently a $C_{2-18}$-hydrocarbyl group;

A and B are hydrocarbyl groups which together comprise a total of 3 to 18 carbon atoms; and each R is independently hydrogen, alkyl, alkoxy, substituted alkyl or substituted alkoxy.

7. The method of claim 5 wherein the poly($C_{3-18}$-hydrocarbyl monoguanidine) comprises at least one group of Formula (3) or salts thereof:

Formula (3)

wherein:

n is from 2 to 50.

* * * * *

UNITED STATES PATENT AND TRADEMARK OFFICE
CERTIFICATE OF CORRECTION

PATENT NO.      : 6,830,310 B2
DATED           : December 14, 2004
INVENTOR(S)     : Iu et al.

It is certified that error appears in the above-identified patent and that said Letters Patent is hereby corrected as shown below:

<u>Title page,</u>
Item [75], Inventors, delete "Tsa" and insert -- Tsao --.

Signed and Sealed this

Fifth Day of July, 2005

JON W. DUDAS
*Director of the United States Patent and Trademark Office*